(12) United States Patent
Zhang et al.

(10) Patent No.: US 8,094,643 B2
(45) Date of Patent: Jan. 10, 2012

(54) DYNAMIC POWER MANAGEMENT FOR TIME DIVISION MULTIPLEXING DEVICES

(75) Inventors: Yunjun Zhang, San Diego, CA (US); Azzedine Touzni, Algonquin, IL (US)

(73) Assignee: QUALCOMM Incorporated, San Diego, CA (US)

( * ) Notice: Subject to any disclaimer, the term of this patent is extended or adjusted under 35 U.S.C. 154(b) by 796 days.

(21) Appl. No.: 12/170,491

(22) Filed: Jul. 10, 2008

(65) Prior Publication Data
US 2010/0008349 A1    Jan. 14, 2010

(51) Int. Cl.
*H04B 7/212* (2006.01)

(52) U.S. Cl. .................................... 370/347; 370/337

(58) Field of Classification Search .......... 370/335–338, 370/342–347, 442–444, 537–541; 455/13.4, 455/517–522, 127.1, 127.5, 572
See application file for complete search history.

(56) References Cited

U.S. PATENT DOCUMENTS

| | | | | |
|---|---|---|---|---|
| 6,061,405 A * | 5/2000 | Emami | | 375/260 |
| 6,493,331 B1 * | 12/2002 | Walton et al. | | 370/341 |
| 6,560,463 B1 | 5/2003 | Santhoff | | |
| 7,240,223 B2 | 7/2007 | De Cesare et al. | | |
| 7,286,609 B2 * | 10/2007 | Maltsev et al. | | 375/267 |
| 7,539,518 B2 | 5/2009 | Kanno | | |
| 7,570,953 B2 * | 8/2009 | Maltsev et al. | | 455/450 |
| 7,583,977 B2 * | 9/2009 | Willenegger et al. | | 455/522 |
| 7,716,704 B2 | 5/2010 | Wang et al. | | |
| 7,929,059 B2 | 4/2011 | Watson et al. | | |
| 7,950,042 B2 | 5/2011 | Yousef | | |
| 2005/0058151 A1 * | 3/2005 | Yeh | | 370/445 |
| 2006/0120378 A1 | 6/2006 | Usuki et al. | | |
| 2006/0225109 A1 | 10/2006 | Seo | | |
| 2007/0110105 A1 | 5/2007 | Usuki et al. | | |
| 2007/0188665 A1 | 8/2007 | Watson et al. | | |
| 2007/0247936 A1 | 10/2007 | Direnzo et al. | | |
| 2008/0209474 A1 | 8/2008 | Pjanovic et al. | | |
| 2008/0216116 A1 | 9/2008 | Pekonen et al. | | |
| 2008/0316950 A1 * | 12/2008 | Damnjanovic | | 370/311 |

(Continued)

FOREIGN PATENT DOCUMENTS

EP    1684450 A2    7/2006

OTHER PUBLICATIONS

DVB, Digital Video Broadcasting, DVB-H Implementation Guidelines, TM 2977 Rev. 9, Draft TR 102 377, V1.2.2, ETSI, 17A Ancienne Route 1218 Grand Saconnex, Geneva Switzerland, Jan. 31, 2006, XP040408488, paragraph [04.3], paragraph [05.3], paragraph [8.5.2], paragraph [8.6.1] - paragraph [8.6.3].

International Preliminary Report on Patentability—PCT/US2009/058078, The International Bureau of WIPO—Geneva, Switzerland, Jan. 31, 2010.

(Continued)

*Primary Examiner* — Thai Hoang
(74) *Attorney, Agent, or Firm* — Kevin T. Cheatham (57) ABSTRACT

A method of dynamic power management in a time division multiple access (TDMA) system. The method comprising comparing each of a plurality of streams; grouping each of the plurality of streams into a plurality of powergroups, wherein each of the plurality of powergroups may comprise multiple streams, scheduling a burst transmission based on the plurality of powergroups; and adjusting the power stage based on the plurality of powergroups, wherein the system is configured to turn off selected components based on the power stage and the scheduled burst transmissions.

13 Claims, 12 Drawing Sheets

U.S. PATENT DOCUMENTS

| | | |
|---|---|---|
| 2009/0031374 A1 | 1/2009 | Choi |
| 2009/0106571 A1 | 4/2009 | Low et al. |
| 2009/0168902 A1 | 7/2009 | Kisoda et al. |
| 2009/0241163 A1 | 9/2009 | Seo |
| 2009/0323829 A1* | 12/2009 | Riveiro et al. ............... 375/257 |
| 2010/0008349 A1 | 1/2010 | Zhang et al. |
| 2010/0027726 A1 | 2/2010 | Lin |
| 2010/0172279 A1* | 7/2010 | Chen et al. .................... 370/312 |
| 2010/0316024 A1* | 12/2010 | Kiran et al. ................... 370/335 |

OTHER PUBLICATIONS

International Search Report Written Opinion—PCT/US2009/058078, International Search Authority—European Patent Office—Feb. 4, 2010.

European Telecommunications Standards Instutite, "Digital Video Broadcasting (DVB); DVB-H Implementation Guidelines", ETSI TR 102 377, V1.2.1, (Nov. 2005).

\* cited by examiner

DYNAMIC POWER MANAGEMENT FOR TIME DIVISION MULTIPLEXING DEVICES

FIELD OF INVENTION

This application is related to broadcast systems.

BACKGROUND

Power management is utilized in a mobile device to minimize the power consumption of the overall system, which can extend battery life and prevent overheating the device. For example, power management has been introduced for single burst transmissions in digital video broadcasting-handheld (DVB-H) handsets.

The DVB-H codec implements multiprotocol encapsulation (MPE), MPE forward error correction (MPE-FEC), and time slicing as a part of its power management scheme.

Time slicing comprises the transmission of data traffic in bursts followed by periods of no transmissions. The burst transmissions are referred to as time slices. In order to reduce the power consumption of the DVB-H handset, the DVB-H handset can shut down the receiver in between the time slices.

In a typical DVB-H communication, multiple input streams are received by different sources as individual elementary streams. The input streams are multiplexed according to a selected time slicing method. MPE-FEC coding, which provides an additional layer of error correction, is performed separately for each individual elementary stream. The system then performs MPE encapsulation of the data packets and embeds them into a transport stream.

Figure 1:
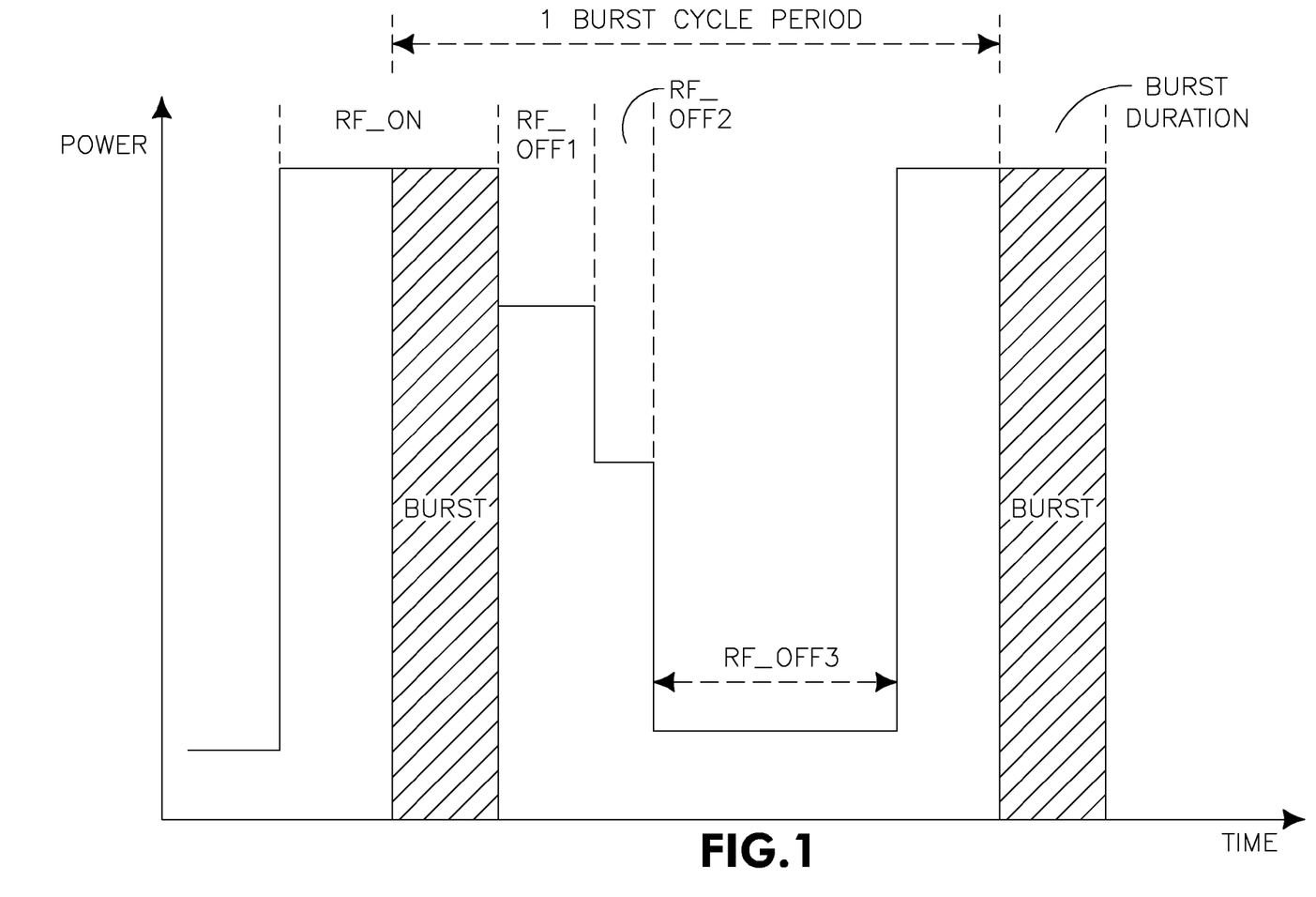
FIG. 1 shows the power consumption stages during the reception of a single burst by a DVB-H handset.

FIG. 1 shows the power consumption stages during the reception of a single burst by a DVB-H handset. The power management is divided into the four power stages RF_ON, RF_OFF1, RF_OFF2, RF_OFF3. A fifth stage, the STANDBY stage is not shown. Table 1 is a description of the five power stages.

TABLE 1

| Power Stage | Description |
| --- | --- |
| RF_ON | The RF part is active and DVB-H demodulation is active. The wanted time-sliced burst transmission is received. |
| RF_OFF1 | The RF part is shut down. MPE-FEC calculation is ongoing. IP packets with no errors can be forwarded before MPE-FEC calculation is finalized. |
| RF_OFF2 | The MPE-FEC calculation is finished. DVB-H handset is feeding data for application engine. |
| RF_OFF3 | The data transfer to application engine is finished and the DVB-H handset is waiting for the next burst transmission. |
| STANDBY | The DVB-H application is not used. The DVB-H handset is in the standby stage waiting for a wake command. |

Figure 2:
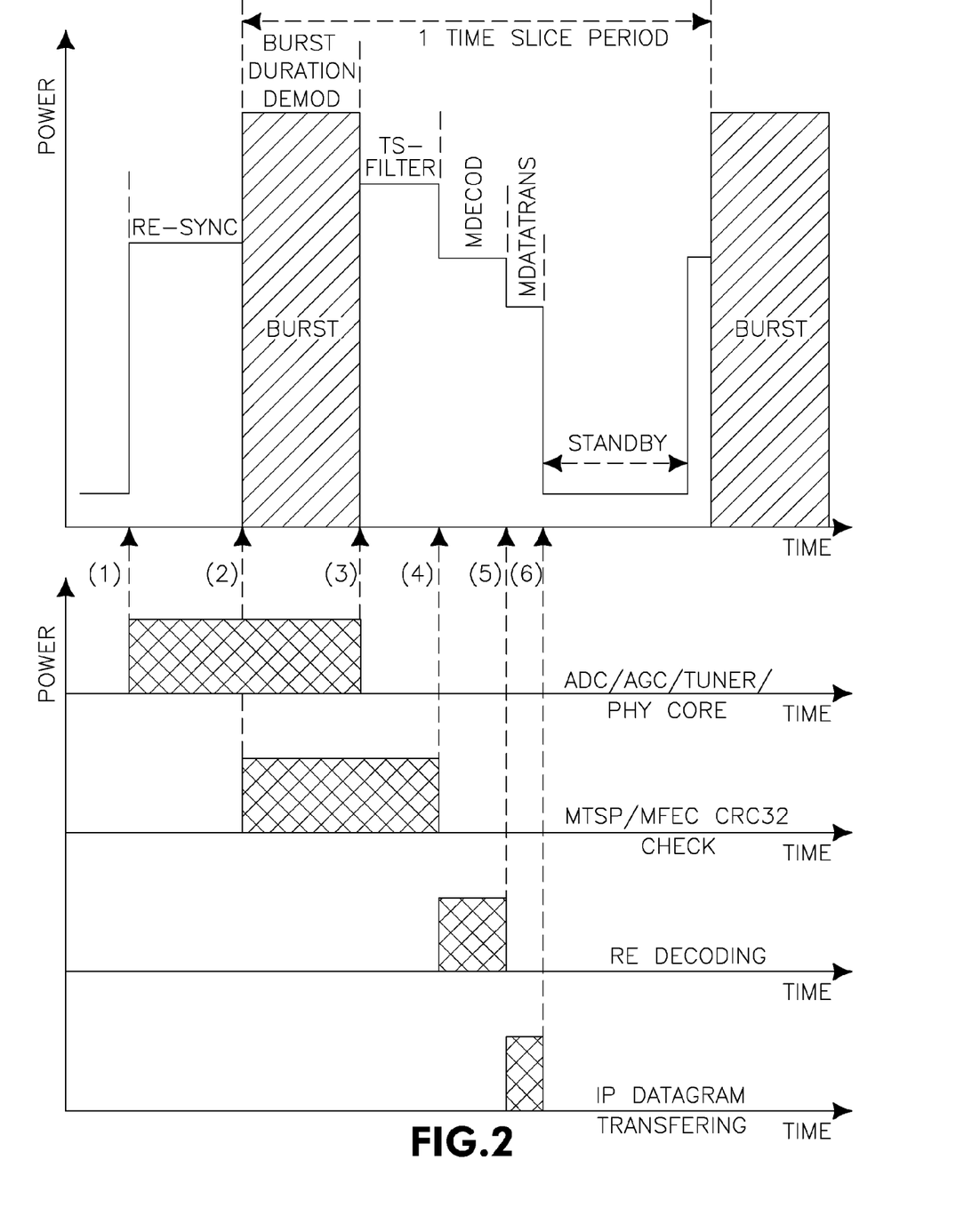
FIG. 2 shows the power stages during reception of a single burst transmission with detected MPE-FEC errors.

FIG. 2 shows the power stages during reception of a single burst transmission with detected MPE-FEC errors. The RF_ON mode is further divided into two stages, the demodulator re-synchronization (re-sync) stage and the demodulation (demod) stage. During the re-sync stage, an analog-to-digital converter, automatic gain control, tuner, and core processor are all operating. During the demod stage, the analog-to-digital converter, automatic gain control, tuner, core processor, multistream transport processor (MTSP, the MFEC decoder and CRC modules are all operating. When there are detectable errors in the MPE-FEC table, the RF_OFF1 stage is further divided into a transport stream filtering (TS-filter) stage, an MPE-FEC decoding (mdecod) stage, and an MDATATRANS stage. During the TS-Filter stage, the MTSP, MFEC, and CRC blocks are all operating. During the mdecod stage, an RE decoding module is operating. Finally during the MDATATRANS stage, the IP datagram is operating.

Figure 3:
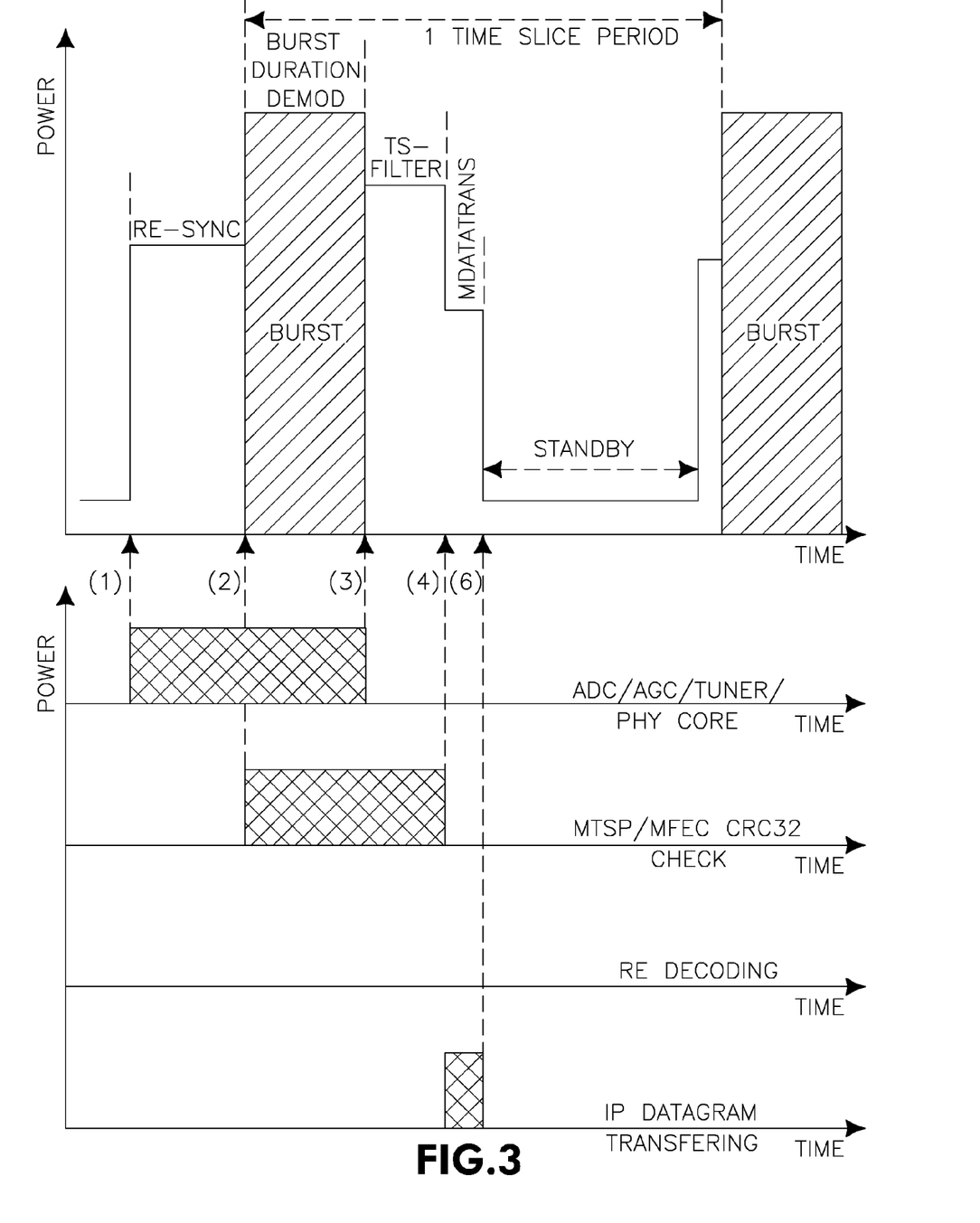
FIG. 3 shows the power stages during reception of a single stream transmission where no MPE-FEC errors have been detected.

FIG. 3 shows the power stages during reception of a single stream transmission where no MPE-FEC errors have been detected. An analog-to-digital converter, automatic gain control, and tuner/PHY core consume power during re_sync stage and demod stage. The processor, the MFEC decoder and other devices consume power during the demod stage and the TS-filter stage.

Figure 4A:
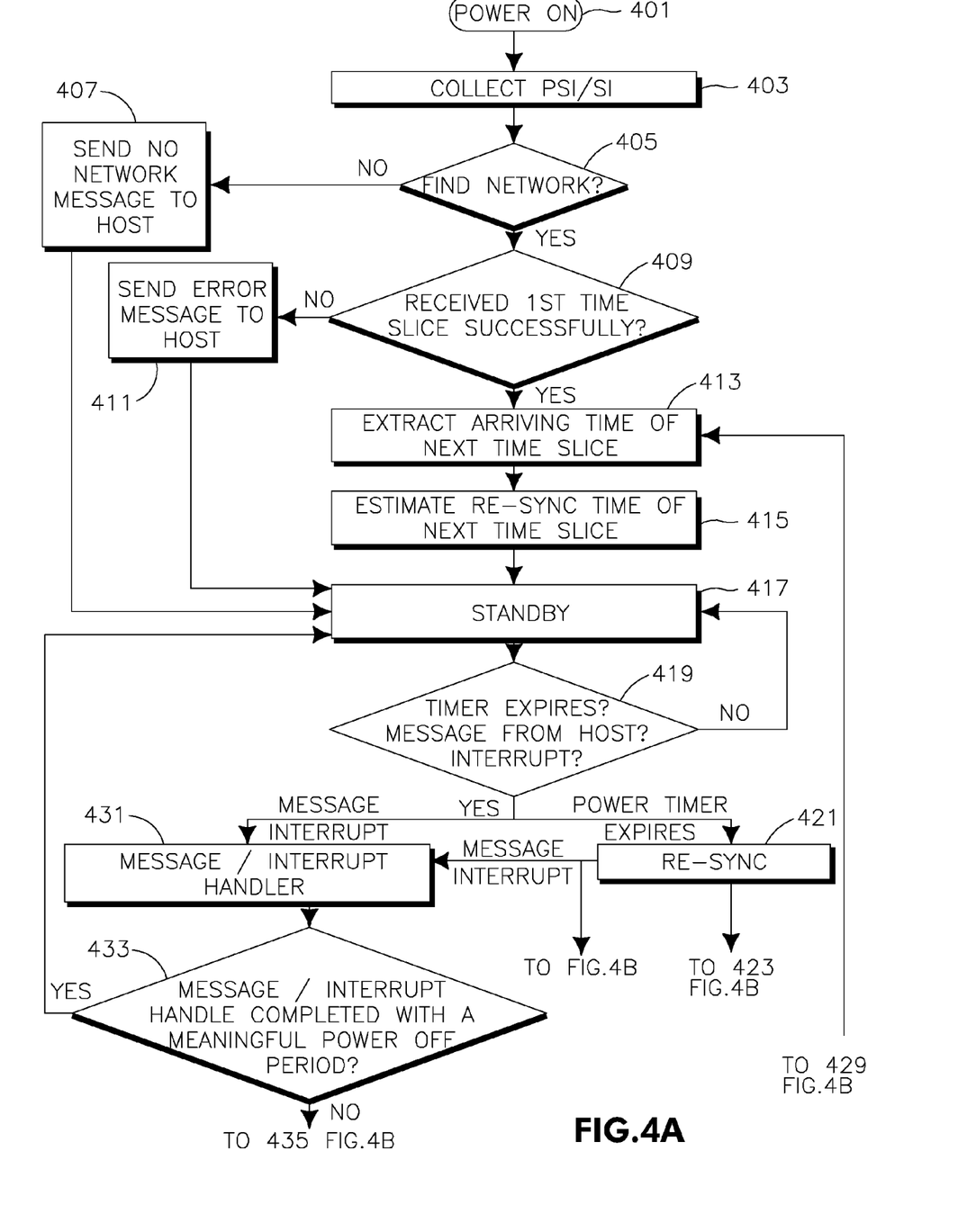
FIGS. 4a and 4b are flow diagrams of a top level power management a DVB-H handset receiving a for single burst transmission.
Figure 4B:
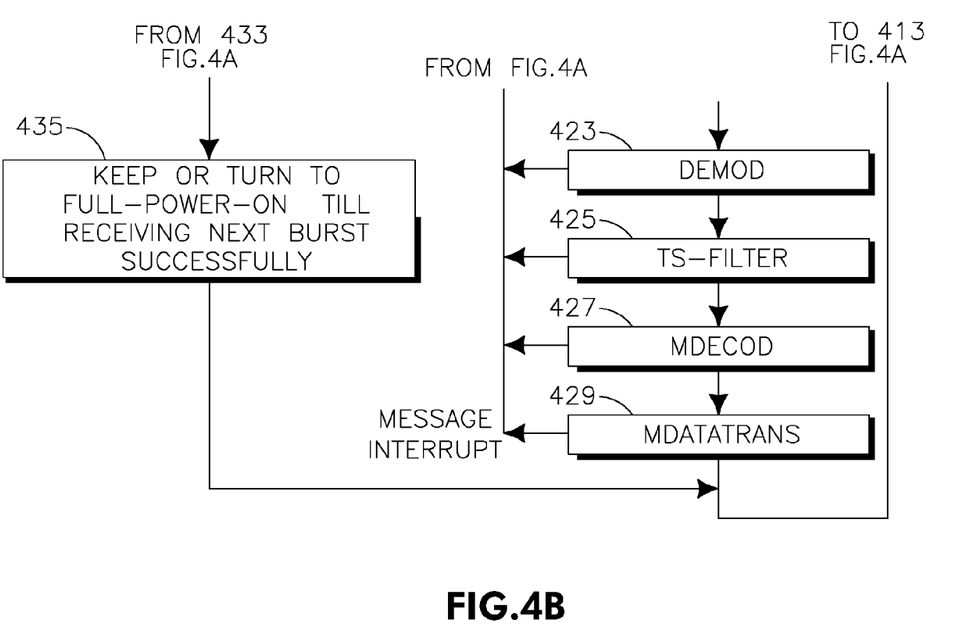

FIG. 4A and FIG. 4B together comprise a flow diagram of a top level power management method for a DVB-H handset receiving a single burst transmission. The handset power is activated (401). The program specific information/service information (PSI/SI) is collected (403). The handset then searches for a network (405). If no network is located, a "No Network" message is transmitted to the host (407). Otherwise, if a network is located, the handset determines whether the first time slice is received successfully (409).

If the first time slice is not received, the handset transmits an error message to the host (411). If the first time slice is received successfully, then the handset extracts the arriving time of the next time slice (413). The handset then estimates the resynchronization time and sets the power management timer (415). Next, the handset enters standby stage (417). The handset waits in standby stage, until the power management timer expires, a message is received from the host, or an interrupt is received (419). If the power timer expires, the handset enters re_sync stage (421), then demod stage (423), then TS-filter stage (425), then mdecod stage (427) and then MDATA Trans stage (429). However, if the handset receives a message from the host or an interrupt, the handset activates the message/interrupt handler (431). The handset then determines whether the message or interrupt handling can be performed within a meaningful power off period (433), and if so, then the handset returns to standby stage (417). If interrupt handling cannot be performed within a meaningful power off period, then the handset operates on full-power-stage until it receives the next burst successfully (435). During the full-power stage both the tuner and demodulator remain on.

Figure 5:
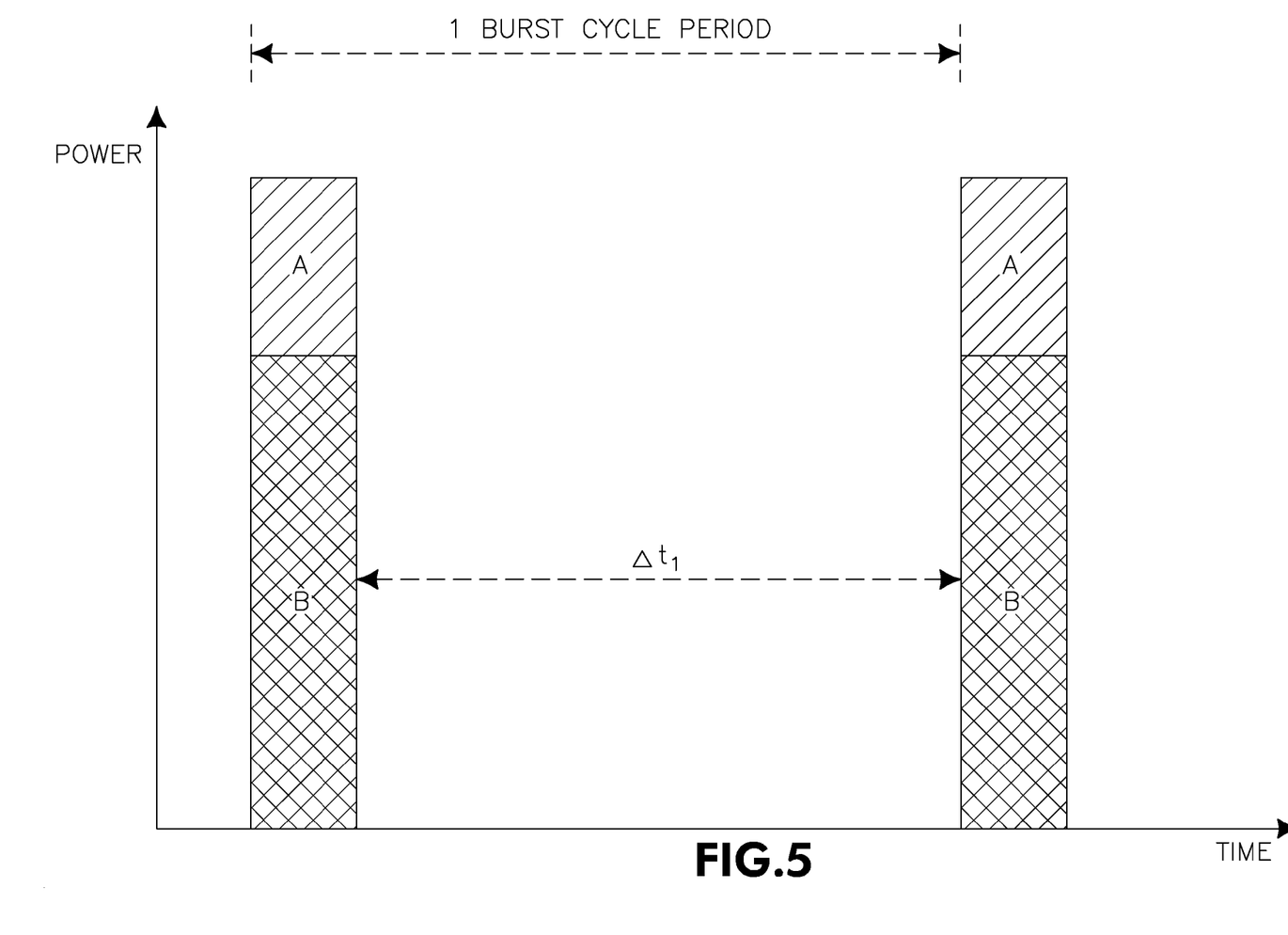
FIG. 5 is a graph showing the power of a DVB-H handset receiving multiple channels which are transmitted on concurrent streams.
Figure 6:
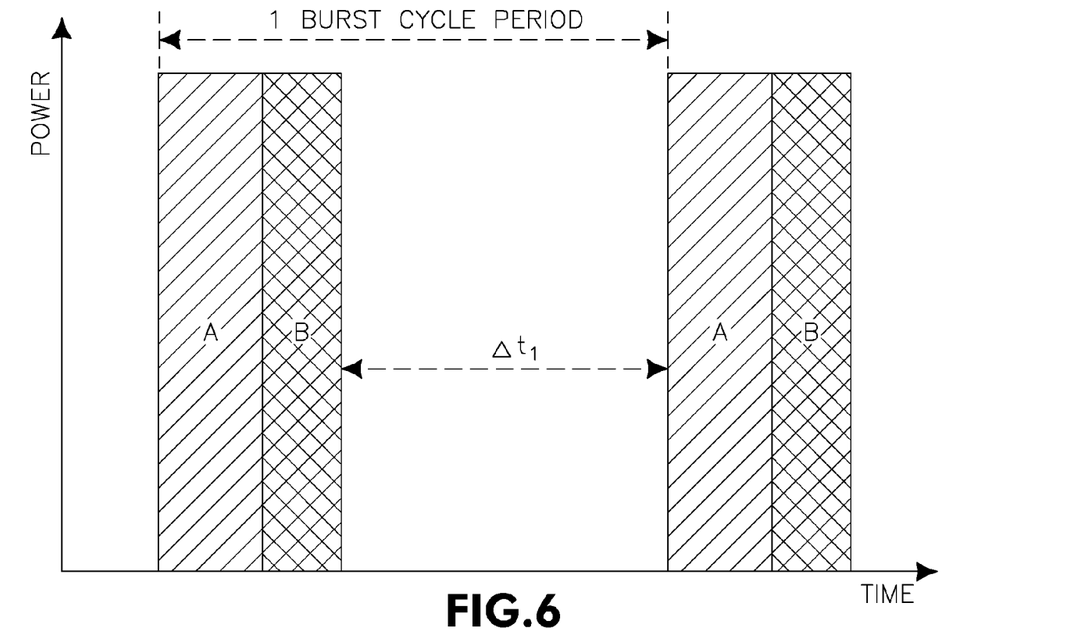
FIG. 6 is a graph showing the power management of a DVB-H handset receiving multiple channels where the services are located on contiguous streams.

In addition to receiving single stream transmissions, the DVB-H Guidelines also support the reception of multiple elementary streams embedded in the same burst as well as multiple services embedded in the single elementary stream. Accordingly, the power management scheme presented in the DVB-H Implementation Guidelines supports the reception of multiple channels on the same device, provided that all required services are on located in concurrent streams or adjacent (i.e. contiguous) burst transmissions, as shown in FIG. 5 and FIG. 6 respectively.

SUMMARY

Methods and apparatuses for dynamic power management for time-division multiplexing (TDM) devices are disclosed. With TDM devices, a single user may use multiple resource units, (e.g. time slots), in a time-sharing cycle for the same service or difference services. A single DVB-H subscriber may require the ability to receive multiple channels, (e.g. one channel for watching, one channel for picture-in-picture, another channel or even multiple channels for recording.) Thus, a dynamic power management scheme for multiple services located on separate and non-adjacent bursts is disclosed.

A minimum power off period, $T_{min}$, is determined along with a time interval of the burst. This value is the minimum period to make meaningful power savings. The bursts are then grouped based on their time intervals and the value of the minimum power off period $T_{min}$. The dynamic power management then operates to control resources based on the groupings.

BRIEF DESCRIPTION OF THE DRAWINGS

A more detailed understanding may be had from the following description, given by way of example in conjunction with the accompanying drawings wherein.

DETAILED DESCRIPTION

There are three scenarios for transmitting multiple element streams in DVB-H, as discussed further below. To illustrate the design of multiple power stream management, an example using two element streams is shown for all three scenarios.

FIG. 5 is a graph showing the power management of a DVB-H handset receiving multiple channels which are transmitted on concurrent streams.

FIG. 6 is a graph showing the power management of a DVB-H handset receiving multiple channels where the services are transmitted on contiguous streams.

Figure 7:
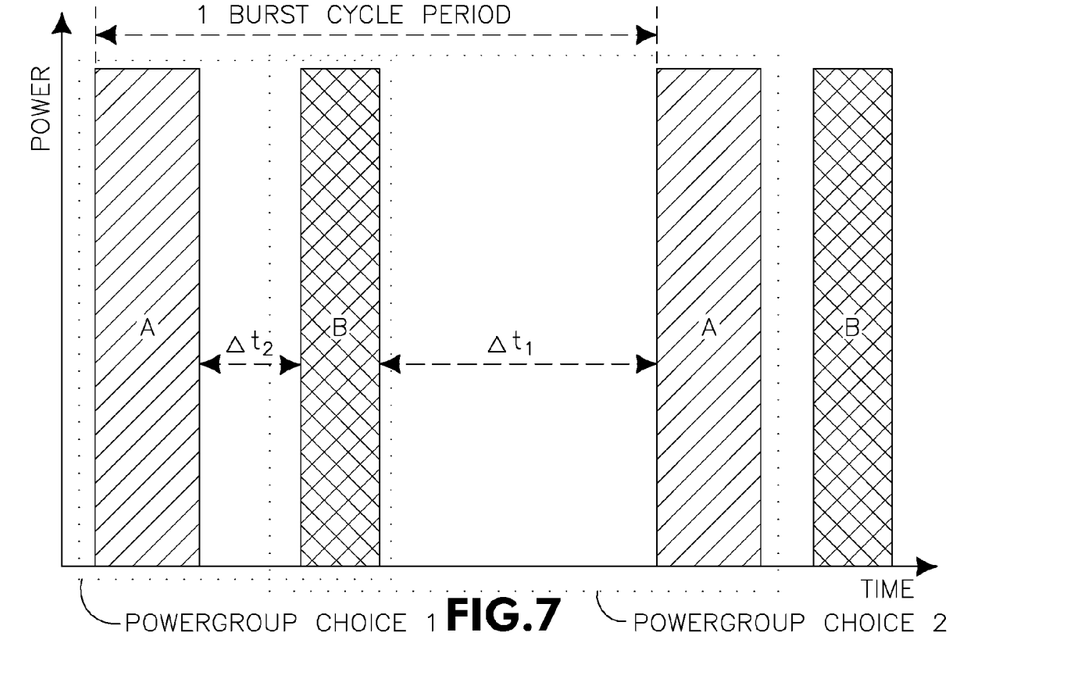
FIG. 7 is a graph showing the power management of a DVB-H handset receiving multiple channels where the services are located on isolated streams.

FIG. 7 is a graph showing the power management of a DVB-H handset receiving multiple channels where the services are located on isolated streams.

The power management scheme presented in the DVB-H Implementation Guidelines covers the concurrent stream and contiguous stream scenarios. However, a dynamic power management scheme focusing on an isolated stream scenario and the combination of the three scenarios is disclosed herein.

Figure 8:
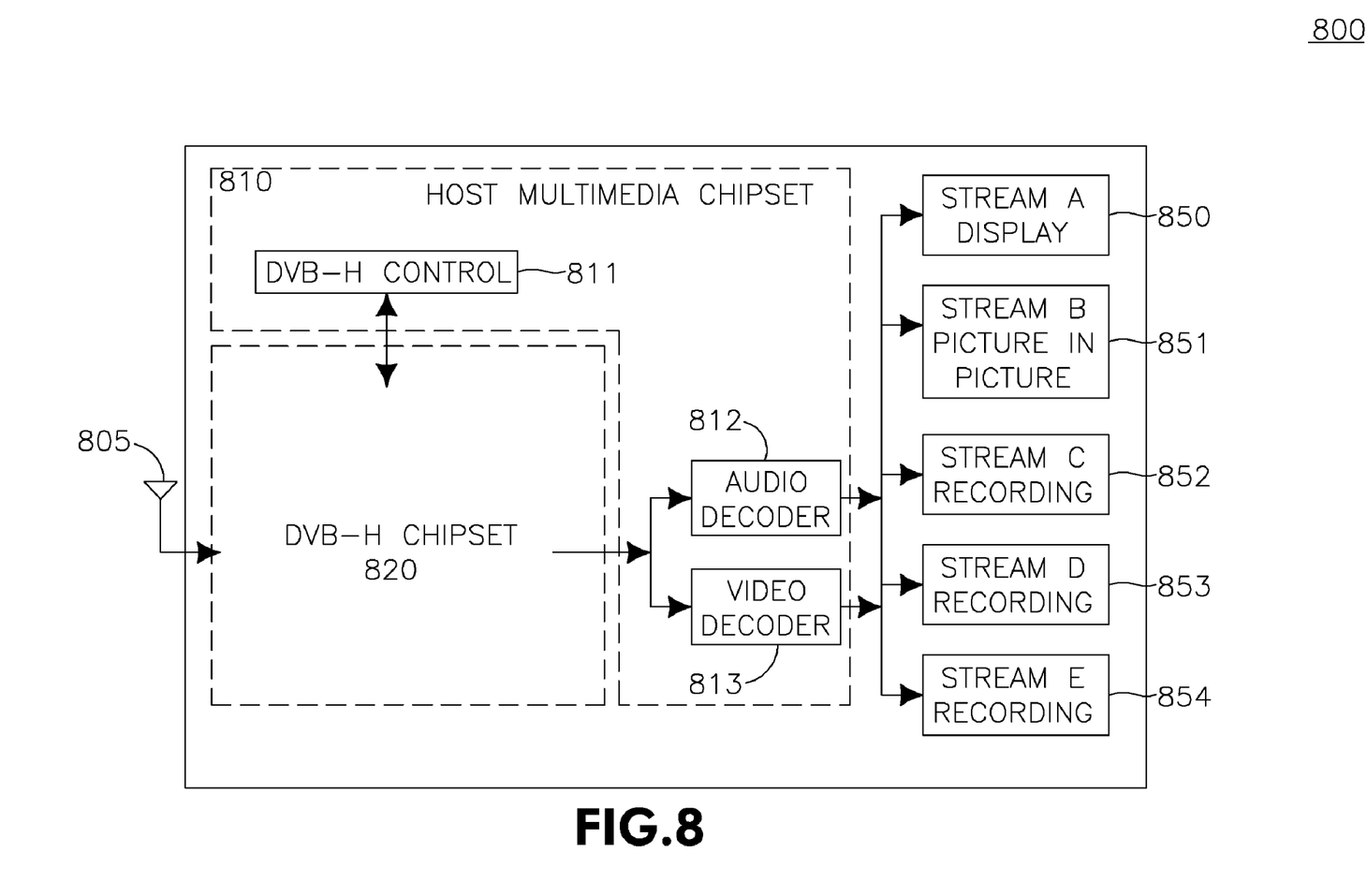
FIG. 8 is a block diagram of a multiple stream DVB-H system.

FIG. 8 is a block diagram of a multiple stream DVB-H system 800, implemented in a DVB-H handset. The system 800 includes an antenna 805, a DVB-H chipset 820, and a host multimedia chipset 810 which outputs a plurality of streams (five streams corresponding to five separate services 850-854.) The host multimedia chipset 810 includes a DVB-H control module 811, an audio decoder 812 and a video decoder 813. The multiple stream application system is configured to support multiple services to each user, for example including a primary display, a secondary display for picture in picture, and multiple streams for simultaneous recording. It would be understood by those of skill in the art that more or less streams having a variety of different uses not identified herein may also be implemented.

Figure 9:
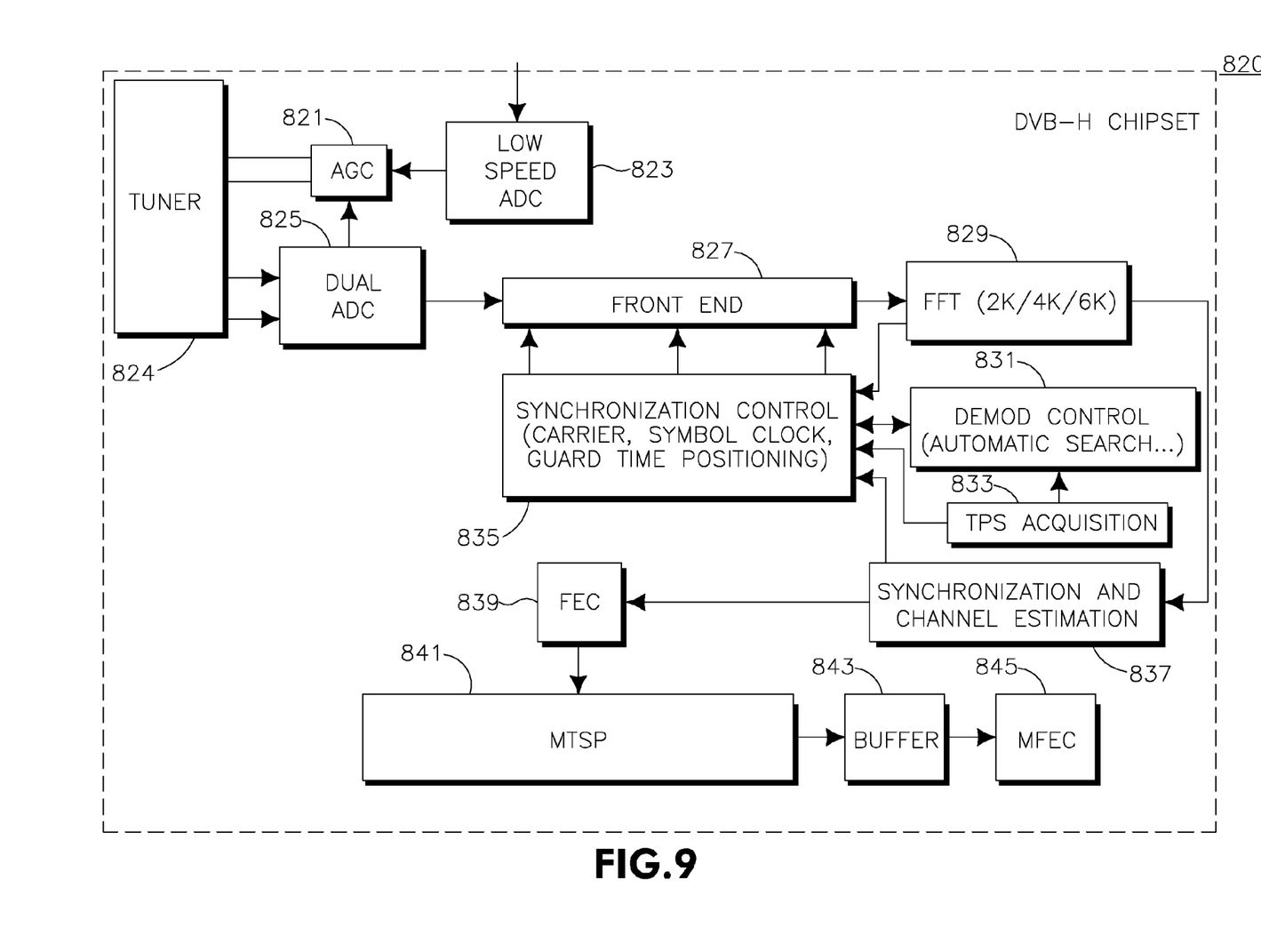
FIG. 9 is a block diagram of the DVB-H chipset 820 of FIG. 8.

FIG. 9 is a block diagram of the DVB-H chipset 820 of FIG. 8. The DVB-H chipset 820 comprises an automatic gain control (AGC) 821, a low speed analog-to-digital converter (ADC) 823, a dual ADC 825, a DVB-H front end processing block 827, a fast Fourier transform (FFT) block 829, a demodulation control block 831, a transmission parameter signal (TPS) acquisition block 833, a synchronization and channel estimation (SCE) block 837, a forward error correction block 839, a multi-transport stream processor (MTSP) 841, a buffer 843, and an MFEC decoder 845. While the MFEC decoder 845 is typically located in the DVB-H chipset, it can be located in the audio decoder and the video decoder as well.

The AGC 821 is configured to adjust the gain to an appropriate level for a range of input signal levels.

The low speed ADC 823 and the Dual ADC 825 are both configured to receive continuous signals and convert them into discrete digital signals.

The DVB-H front end processing block 827 is configured to perform the front end processing implemented on a DVB-H handset including frequency offset correction, filtering, frequency offset estimation, and guard interval removal.

The fast Fourier transform (FFT) block 829 is configured to receive a time-domain signal, compute the discrete Fourier transform (DFT) of the time-domain signal and transform it into a frequency-domain signal.

The TPS Acquisition block 833 is configured to extract the TPS signals that may be embedded in the signal by a DVB-H transmitter.

The SCE block 837 generates a channel estimate by estimating the noise power based on an inserted pilot signal or the TPS signals.

The FEC decoder 839 provides forward error correction decoding of the signal.

The MTSP 841 may process multiple streams in each burst cycle period. The MTSP 841 may separate the multiple streams into individual parts and transmit them to the buffer 843. In one embodiment, the MTSP 841 may be configured to perform powergrouping. In order to determine the powergrouping, several factors including the time interval of the burst, the minimum power saving, and the burst cycle period must be considered. This is only one example of powergrouping, other factors may also be considered.

Referring back to FIG. 7, two isolated streams (i.e. side-by-side) streams are shown (stream A and stream B). After receiving the isolated streams, the MTSP 841 determines the intervals of $\Delta t_1$ and $\Delta t_2$. The number of power off periods (zero, one or two) are determined based on the intervals $\Delta t_1$ and $\Delta t_2$. Based on the power-off periods, the MTSP 841 determines whether a specific power-off period is too short, which means that no significant reduction in power consumption would occur if certain components were turned off.

The MTSP's 841 determination may comprise mapping the channel distortions corresponding to different degrees of channel difficulties in decoding/demodulation the signal into the time it requires to demodulate the signal. The channel is typically segmented in a set of "typical" known impairments (such as "multipath", noise, dynamic conditions, etc.), each condition maps with some timing requirements that result from the type of algorithm that needs to be used to correct the different distortions.

The demodulation control block 831 may be configured to demodulate the signals based on a set of metrics derived from the received signal at different positions in the receiver. The MTSP 841 may also use a look up-table to add the time to determine if the power-off period indicated in a side band signal is long enough to allow for a power-off and a re-initialization of the receiver prior to receiving a new burst.

After the MTSP 841 determines the power-off periods for each of the components of the DVB-H handset, the MTSP 841 signals each component to power-off or enter a standby stage, for a predetermined time, or alternatively until a wake-up signal is transmitted. While the dynamic power management is shown to be controlled by the MTSP 841, it should be understood that it may be performed by any module described herein, or by a separate dynamic power management module. Additionally, while there are a plurality of separate components shown, this is for convenience of explanation since several or all of the components may be implemented in a single unit.

Each element stream is stored separately in the buffer 843 (or alternatively in separate buffers) and its size is configurable.

The MPE-FEC decoder 845 is configured to process multiple MPE-FEC tables to decode multiple streams in each burst cycle period. Referring to the concurrent stream scenario of FIG. 5, if the MPE-FEC decoder 845 is designed to process the multiple MPE-FEC tables sequentially, then the MTSP 841 and MPE-FEC decoder 845 remain in a powered-on state for a longer duration than they would during the single stream scenario. However, the MPE-FEC decoder 845 may be configured to process multiple MPE-FEC tables simultaneously, which enables handset to operate with the same dynamic power management cycle timing as the single stream scenario.

In some scenarios, due to the nature of the sequential process of the MTSP 841 and the MPE-FEC decoder 845, when the total number of desired streams within a single burst reaches a threshold amount, the MTSP 841 and the MPE-FEC decoder 845 may remain in a powered-on state continuously, this means that the tuner 824 and the other components are powered on continuously. However, power consumption can still be reduced by powering down the tuner 824, low speed ADC 823, dual ADC 825, AGC 821, or the DVB-H front end processing block 827.

Figure 10:
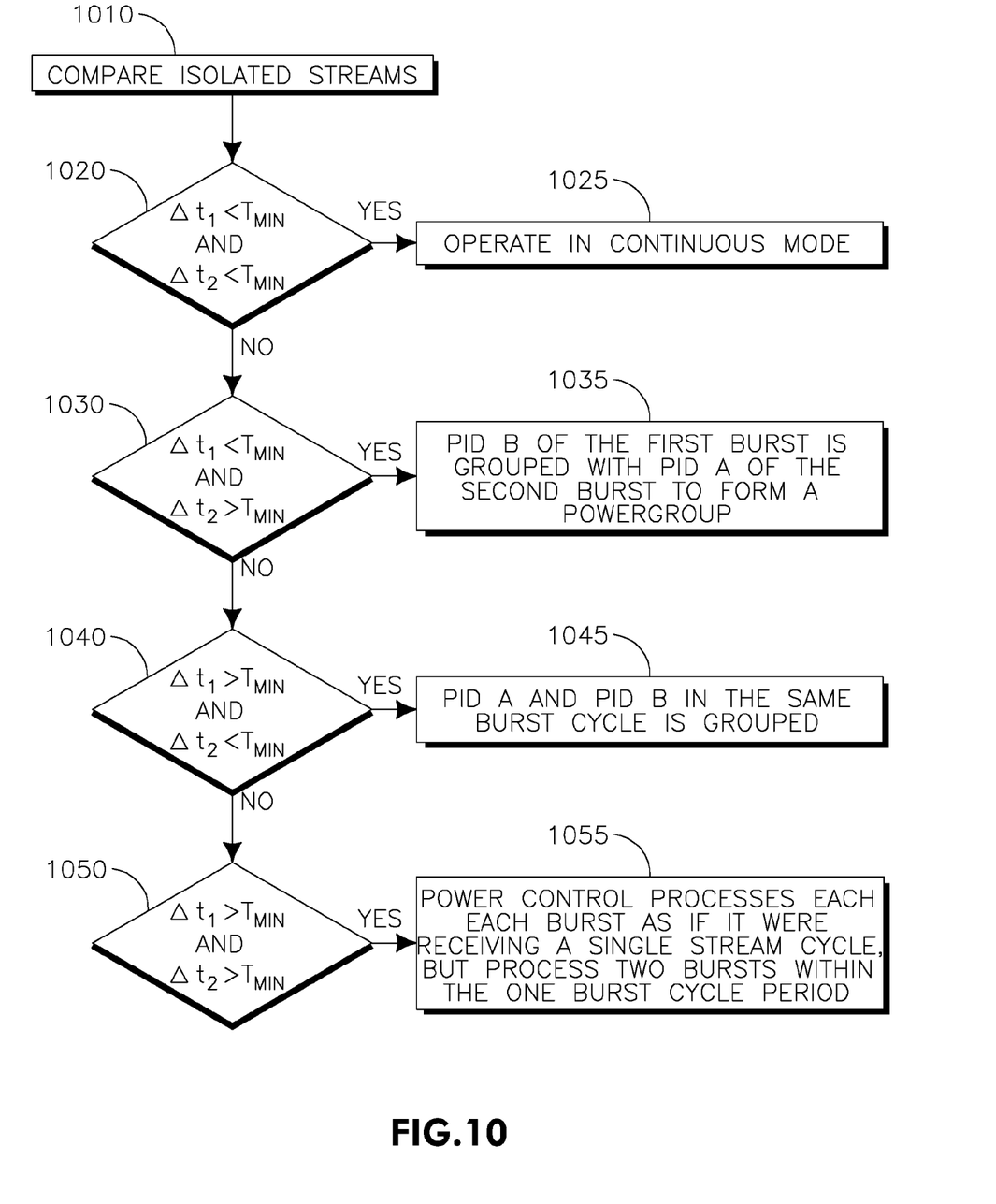
FIG. 10 is a flow diagram of a method of dynamic power management.

FIG. 10 is a flow diagram of a method 1000 of dynamic power management. After an input containing a plurality of isolated streams is received, the DVB-H handset 800 compares the isolated streams (1010). The DVB-H handset 800 then determines if both interval $\Delta t_1$ and interval $\Delta t_2$ are too short, i.e. ($\Delta t_1 < T_{min}$ and $\Delta t_2 < T_{min}$), (1020). If so, then the handset 800 operates in a continuous mode, (i.e., all blocks remained powered on), (1025), and the MTSP 841 operates in monitoring mode.

If any one of interval $\Delta t_1$ and interval $\Delta t_2$ is long enough to have a meaningful power off period (i.e. a power off period which is offers at least some minimum power savings), then the dynamic power management is configured to operate in the following scenarios, and different components may be powered off to conserve power.

Referring back to FIG. 10, the DVB-H handset 800 may then determine that interval $\Delta t_2$ is long enough to start a power off period and interval $\Delta t_1$ is too short, i.e. $\Delta t_1 < T_{min}$ and $\Delta t_2 > T_{min}$ (1030), and if so, a packet identifier (PID) B of the first burst is grouped with the PID A of the second burst to form a powergroup (shown as powergroup 2 in FIG. 7).

On the other hand, referring to FIG. 10, if the DVB-H handset 800 determines that interval $\Delta t_1$ is long enough to have a meaningful power off period and interval $\Delta t_2$ is too short, (i.e. $\Delta t_1 > T_{min}$ and $\Delta t_2 < T_{min}$), (1040), then PID A and PID B in the same burst cycle period are grouped (1045), (shown as power group choice 1 in FIG. 7). The dynamic power management of this example is similar to the power management scenario of contiguous streams. However, unlike contiguous streams, depending on the values of interval $\Delta t_1$ and interval $\Delta t_2$, the MTSP 841 and the MPE-FEC decoder 845 may be powered-off in the same powergroup after the first PID is processed, while the demodulation control block 831 is operating during the gap.

If both interval $\Delta t_1$ and interval $\Delta t_2$ are long enough to have a meaningful power off period, (i.e. $\Delta t_1 > T_{min}$ and $\Delta t_2 > T_{min}$) (1050), dynamic power management will allow the handset 800 to receive each burst as if it were in a single stream in each burst cycle period, but the DVB-H handset 800 will process the two bursts within one burst cycle period (1055).

Figure 11:
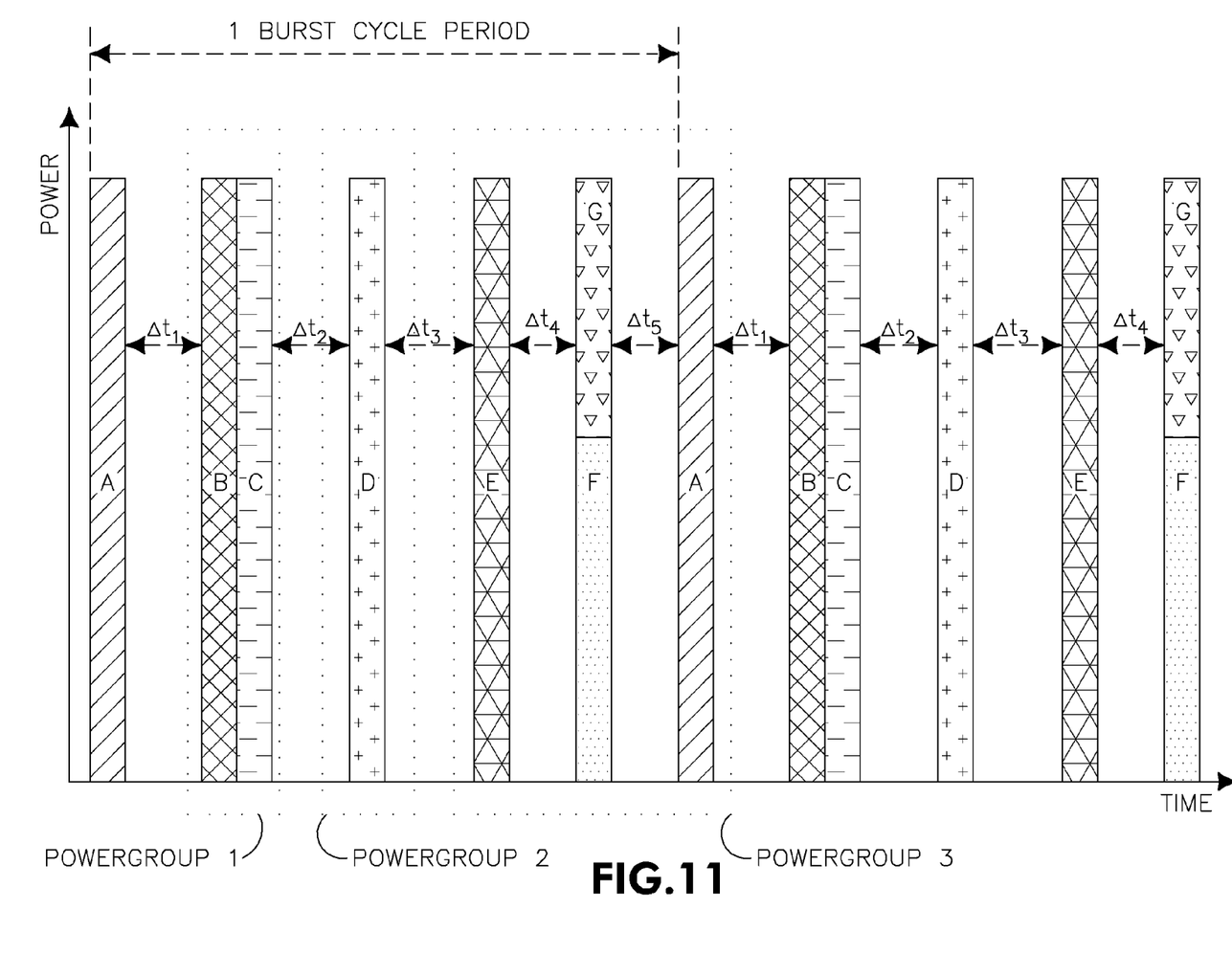
FIG. 11 shows an example case of multiple stream dynamic power management with seven streams and three power groups.

FIG. 11 shows an example case of multiple stream dynamic power management with seven streams and three power-groups. Dynamic power management may be used to arrange the seven element streams into a burst cycle period. Determining powergroups in a case with multiple streams and multiple powergroups is critical to have an efficient dynamic power management mechanism. In this example, there are five time intervals among all the element streams in one burst cycle period. Though there are 25=32 possibilities, shown are the following five: $\Delta t_1 > T_{min}$, $\Delta t_2 > T_{min}$, and $\Delta t_3 > T_{min}$, and $\Delta t_4 < T_{min}$, $\Delta t_5 < T_{min}$.

Figure 12:
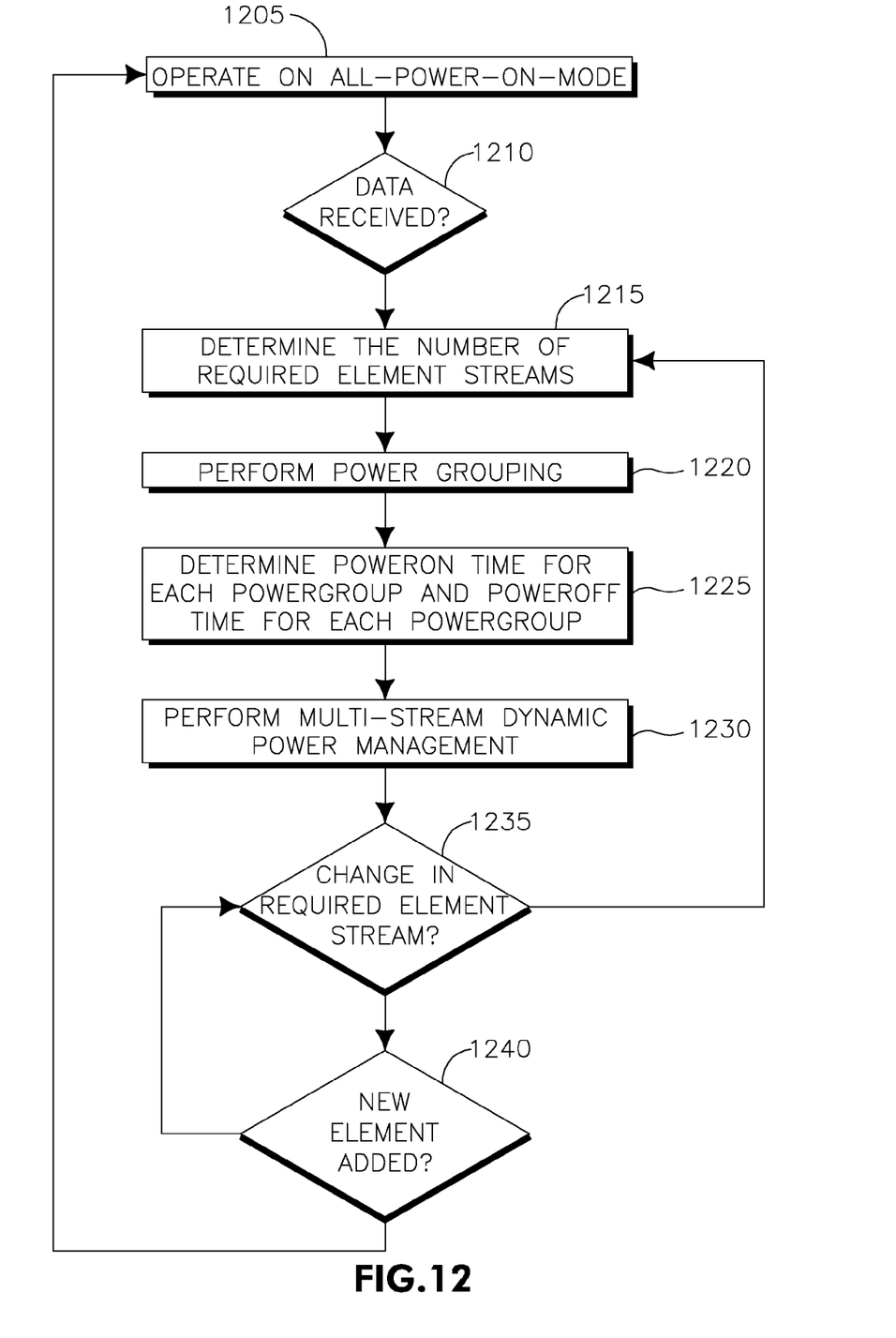
FIG. 12 is a flow diagram of an example dynamic power management procedure.

FIG. 12 shows an example dynamic power management procedure 1200. Initially, the DVB-H handset 800 operates on an all-power-on mode (1205). The DVB-H handset 800 determines whether all the needed information is correctly received, including the time interval information (1210). Once the needed information is received, the DVB-H handset 800 then determines the number of required element streams and the corresponding burst time intervals (1215). Power-grouping is then performed based on the number of required element streams and their corresponding burst time intervals (1220). The PowerOn time in each powergroup is determined by the first burst in the same powergroup and the PowerOff time is determined by the last burst in the same powergroup, as will be explained in greater detail hereinafter (1225). The PowerOn time may be set to a predetermined time before the first burst in the powergroup and depending on the timing between bursts, the PowerOff time may be set some predetermined time after the last burst in a powergroup. Based on the PowerOn and PowerOff times, multi-stream dynamic power management is performed (1230). If there is a change in number of required element streams, the DVB-H handset will determine the number of element streams required and re-perform the powergrouping (1235). If the handset determines that a new element stream is added (1240), it will switch to all-power-on mode until the needed new information is extracted from the latest element stream to be added and powergrouping is completed.

According to one embodiment, all the bursts which have the time interval less than $T_{min}$ are grouped in the same powergroup. Referring to FIG. 12, the seven element streams (i.e., streams A to G) are grouped into three powergroups, (i.e., powergroup 1, powergroup 2, and powergroup 3). Each powergroup may then be processed as a single burst. In one embodiment, the MTSP 841 and/or the MPE-FEC decoder 845 may be powered off if the time gap between any two bursts in the same powergroup is long enough to save meaningful power. The amount of time required to save meaningful power may be preprogrammed onto the DVB-H handset 800 or it may be signaled to the DVB-H handset 800.

While the examples above are shown for use in a DVB-H system, they may also be used in other broadcasting networks. Examples of broadcasting networks includes second generation Digital Video Broadcasting—Terrestrial (DVB-T2) Digital Video Broadcasting—Terrestrial/handheld (DVB-T/H), Integrated Services Digital Broadcasting (ISDB)-T, Digital Audio Broadcasting—Terrestrial (DAB-T), Terrestrial-Digital Multimedia Broadcasting (T-DMB), Digital Multimedia Broadcasting-terrestrial/handheld (DMB-TH), and Media-FLO.

The same software and hardware control blocks can be reused by configuring them accordingly for multiple stream control. Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAS) circuits, any other type of integrated circuit (IC), and/or a state machine.

What is claimed is:

1. A method of dynamic power management in a time division multiple access (TDMA) system, the method comprising:
   determining a grouping for a plurality of streams, wherein each of the plurality of streams is grouped into a plurality of powergroups and each of the plurality of powergroups comprise multiple streams;
   scheduling burst receptions based on the plurality of powergroups; and
   adjusting the power stage based on the plurality of powergroups, wherein selected components are powered off based on the power stage and the scheduled burst receptions.

2. The method of claim 1, wherein each of the plurality of streams is stored in separate buffers.

3. The method of claim 1, wherein adjusting the power stage further comprises:
   determining whether the time interval between the isolated streams is below a predetermined threshold, and if so, operating at a continuous power stage.

4. The method of claim 1, further comprising:
   determining a power on time in each powergroup based on a first burst in each powergroup.

5. The method of claim 1, further comprising:
   determining a power off time in each powergroup based on a last burst in the powergroup.

6. The method of claim 1, further comprising:
   detecting a change in a number of required element streams; and
   determining the number of element streams required.

7. The method of claim 6, further comprising:
   regrouping each of the plurality of streams into a plurality of powergroups, wherein each of the plurality of powergroups comprise multiple streams;
   rescheduling burst receptions based on the plurality of powergroups; and
   adjusting the power stage based on the plurality of powergroups.

8. A digital video broadcasting-handheld (DVB-H) handset, the DVB-H handset comprising:
   a receiver configured to receive a plurality of streams;
   a processor configured to determine a powergroup for each of the plurality of streams, wherein each of the powergroups comprise multiple streams, and the processor further configured to schedule burst receptions based on the plurality of powergroups and to adjust the power stage based on the plurality of powergroups and the handset may power on and power off selected components based on the power stage and scheduled burst receptions.

9. The DVB-H handset of claim 8, further comprising:
   a multi-protocol encapsulation forward error correction (MPE-FEC) decoder configured to process multiple MPE-FEC tables to decode multiple streams in each burst cycle period.

10. The MPE-FEC decoder of claim 9, further configured to process multiple MPE-FEC tables simultaneously.

11. The DVB-H handset of claim 8, further comprising:
    at least one buffer configured to store each of the plurality of streams.

12. A machine readable storage medium having a stored set of instructions executable by a machine, the instructions, when executed are adapted to perform operations comprising:
    determine a powergroup for each of a plurality of streams, wherein each powergroup comprise multiple streams;
    schedule burst receptions based on the determined powergroups; and
    adjust the power stage based on the determined powergroups, wherein the selected components are powered off based on the power stage and the scheduled burst receptions.

13. A computer-readable medium containing a first set of instructions adapted to create a processor, wherein the processor is configured to implement a second set of instructions, the second set of instructions comprising:
    instructions to determine a powergroup for each of a plurality of streams, wherein each of the powergroups comprise multiple streams;
    instructions to schedule burst receptions based on the determined powergroups; and
    instructions to adjust the power stage based on the determined powergroups, wherein selected components are powered off based on the power stage and the scheduled burst receptions.

* * * * *